United States Patent
Small et al.

(10) Patent No.: US 10,305,133 B2
(45) Date of Patent: May 28, 2019

(54) NONAQUEOUS REDOX FLOW BATTERY ELECTROLYTE COMPRISING AN IONIC LIQUID WITH A METAL CATION COORDINATED TO REDOX-ACTIVE LIGANDS

(71) Applicant: National Technology & Engineering Solutions of Sandia, LLC, Albuquerque, NM (US)

(72) Inventors: Leo J. Small, Albuquerque, NM (US); Travis Mark Anderson, Albuquerque, NM (US); Harry Pratt, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 122 days.

(21) Appl. No.: 15/597,474

(22) Filed: May 17, 2017

(65) Prior Publication Data

US 2018/0337419 A1    Nov. 22, 2018

(51) Int. Cl.
    *H01M 8/18*    (2006.01)
    *H01M 8/1016*  (2016.01)

(52) U.S. Cl.
    CPC ......... *H01M 8/188* (2013.01); *H01M 8/1016* (2013.01)

(58) Field of Classification Search
    CPC .................. H01M 8/188; H01M 8/1016
    See application file for complete search history.

(56) References Cited

U.S. PATENT DOCUMENTS

| | | | | |
|---|---|---|---|---|
| 2008/0209876 A1* | 9/2008 | Miller | ............... | G11C 13/0009 55/522 |
| 2012/0169298 A1* | 7/2012 | Martin | ................ | H01G 11/58 320/166 |
| 2014/0295311 A1* | 10/2014 | Lipka | ................ | H01M 8/188 429/452 |
| 2016/0204460 A1* | 7/2016 | Bard | .................. | H01M 8/188 320/128 |

OTHER PUBLICATIONS

Anderson, T. M. et al., "Synthesis of an Ionic Liquid with an Iron Coordination Cation", Dalton Transactions, 2010, pp. 8609-8612, vol. 39.

(Continued)

*Primary Examiner* — Maria Laios
*Assistant Examiner* — Kwang Han
(74) *Attorney, Agent, or Firm* — Kevin W. Bieg (57) ABSTRACT

Nonaqueous redox flow batteries (RFB) hold the potential for high energy density grid scale storage, though are often limited by the solubility of the redox-active species in their electrolytes. A systematic approach enables an increase the concentration of redox-active species in electrolytes for nonaqueous RFB, starting from a metal-coordination-cation-based ionic liquid. As an example, starting with an ionic liquid consisting of a metal coordination cation (MetIL), ferrocene-containing ligands and iodide anions can be substituted into the original MetIL structure, enabling a nearly 4× increase in capacity compared to original MetIL structure. Application of this strategy to other chemistries, optimizing electrolyte melting point and conductivity could yield >10 M redox-active electrons.

6 Claims, 8 Drawing Sheets

1a: X = (OTf)$_2$
1b: X = (OTf)I

2a: X = (OTf)$_2$
2b: X = (OTf)I (56) References Cited

OTHER PUBLICATIONS

Pratt, H. D. III et al., "Synthesis and Characterization of Ionic Liquids Containing Copper, Manganese, or Zinc Coordination Cations", Dalton Transactions, 2011, pp. 11396-11401, vol. 40.

Huang, J. et al., "The Lightest Organic Radical Cation for Charge Storage in Redox Flow Batteries", Scientific Reports, 2016, 32102, pp. 1-9, vol. 6.

Milshtein, J. D. et al., "High Current Density, Long Duration Cycling of Soluble Organic Active Species for Non-Aqueous Redox Flow Batteries", Energy & Environmental Science, 2016, pp. 3531-3543, vol. 9.

Sevov, C. S. et al., "Mechanism-Based Development of a Low-Potential, Soluble, and Cyclable Multielectron Anolyte for Nonaqueous Redox Flow Batteries", Journal of the American Chemical Society, 2016, pp. 15378-15384, vol. 138.

Sevov, C. S. et al., "Evolutionary Design of Low Molecular Weight Organic Anolyte Materials for Applications in Nonaqueous Redox Flow Batteries", Journal of the Amercian Chemical Society, 2015, pp. 14465-14472, vol. 137.

Sevov, C. S. et al., "Cyclopropenium Salts as Cyclable, High-Potential Catholytes in Nonaqueous Media", Advanced Energy Materials, 2017, 1602027, vol. 7.

Kaur, A. P. et al., "A Highly Soluble Organic Catholyte for Non-Aqueous Redox Flow Batteries", Energy Technology, 2015, pp. 476-480, vol. 3.

Su. L. et al., "Electrolyte Development for Non-Aqueous Redox Flow Batteries Using a High-Throughput Screening Platform", Journal of the Electrochemical Society, 2014, pp. A1905-A1914, vol. 161.

Wang, W. et al., "Anthraquinone with Tailored Structure for a Nonaqueous Metal-Organic Redox Flow Battery", Chem. Commun. 2012, pp. 6669-6671, vol. 48.

Mun, J. et al., "Non-Aqueous Redox Flow Batteris with Nickel and Iron Tris(2,2'-bipyridine) Complex Electrolyte", Electrochemical and Solid-State Letters, 2012, pp. A80-A82, vol. 15.

Hudak, N. S. et al., "Through-Plane Conductivities of Membranes for Nonaqueous Redox Flow Batteries", Journal of the Electrochemical Society, 2015, pp. A2188-A2194, vol. 162.

Schaltin, S. et al., "Towards an All-Copper Redox Flow Battery Based on a Copper-Containing Ionic Liquid", Chem Comm, 2016, pp. 414-417, vol. 52.

Suttil, J. A. et al., "Metal Acetylacetonate Complexes for High Energy Density Non-Aqueous Redox Flow Batteries", Journal of Materials Chemistry A, 2015, pp. 7929-7938, vol. 3.

Miller, M. A. et al., "Communication-Iron Ionic Liquid Electrolytes for Redox Flow Battery Applications", Journal of the Electrochemical Society, 2016, pp. A578-A579, vol. 163.

Small, L. J. et al., "Diels Alder Polyphenylene Anion Exchange Membrane for Nonaqueous Redox Flow Batteries", Journal of the Electrochemical Society, 2016, pp. A5106-A5111, vol. 163.

Cosimbescu, L. et al., "Anion-Tunable Properties and Electrochemical Performance of Functionalized Ferrocene Compounds", Scientific Reports, 2015, 14117, pp. 1-9, vol. 5.

Kim, H-S. et al., "A Tetradentate (Ni(II) Complex Cation as a Single Redox Couple for Non-Aqueous Flow Batteries", Journal of Power Sources, 2015, pp. 300-304, vol. 283.

Jia, C. et al., "High-Energy Density Nonaqueous All Redox Flow Lithium Battery Enabled with a Polymeric Membrane", Sci. Adv., 2015, e1500886.

Chen, H. et al., "A High-Energy Density Multiple Redox Semi-Solid-Liquid Flow Battery", Advanced Energy Materials, 2016, 1502183.

Zarkesh, R.A. et al., "Voltage Clustering in Redox-Active Ligand Complexes: Mitigating Electronic Communication Through Choice of Metal Ion", Dalton Trans. 2016, pp. 9962-______, vol. 45.

* cited by examiner

NONAQUEOUS REDOX FLOW BATTERY ELECTROLYTE COMPRISING AN IONIC LIQUID WITH A METAL CATION COORDINATED TO REDOX-ACTIVE LIGANDS

STATEMENT OF GOVERNMENT INTEREST

This invention was made with Government support under contract no. DE-NA0003525 awarded by the U.S. Department of Energy to Sandia Corporation. The Government has certain rights in the invention.

FIELD OF THE INVENTION

The present invention relates to redox flow batteries and, in particular, to a nonaqueous redox flow battery electrolyte comprising an ionic liquid with a metal cation coordinated to redox-active ligands.

BACKGROUND OF THE INVENTION

Nonaqueous redox flow batteries (RFBs) hold the potential for high energy density grid scale storage. See R. M. Darling et al., *Energy Environ. Sci.* 7, 3459 (2014); and B. R. Chalamala et al., *Proc. IEEE* 102, 976 (2014). While aqueous chemistries are limited to the 1.5 V potential window of water, many nonaqueous electrolytes with stability ranges greater than 4 V exist, allowing for increased cell voltages and corresponding energy densities. See W. Wang et al., *Adv. Funct. Mater.* 23, 970 (2013); and A. Z. Weber et al., *J. Appl. Electrochem.* 41, 1137 (2011). To best take advantage of the wider potential window of nonaqueous electrolytes, many groups have created highly reversible, electrochemically novel molecules for non-aqueous catholyte and anolyte chemistries ranging from complex, fully organic redox molecules with light weight high current and high efficiencies, to redox-active organic ligands complexed to metal ions, to redox activity centered in the cation core, or to iodide anions. See J. Huang et al., *Sci. Rep.* 6, 32102 (2016); J. D. Milshtein et al., *Energy Environ. Sci.* 9, 3531 (2016); C. S. Sevov et al., *J. Amer. Chem. Soc.* 138, 15378 (2016); C. S. Sevov et al., *J. Amer. Chem. Soc.* 127, 14465 (2015); C. S. Sevov et al., *Adv. Energ. Mater.*, 7, 1602027 (2017); A. P. Kaur et al., *Energy Technol.* 3, 476 (2015); L. Su et al., *J. Electrochem. Soc.* 161, A1905 (2014); W. Wang et al., *Chem. Commun.* 48, 6669 (2012); R. A. Zarkesh et al., *Dalton Trans.* 45, 9962 (2016); J. Mun et al., *J. Electrochem. Soc.* 15, A80 (2012); N. S. Hudak et al., *J. Electrochem. Soc.* 162, A2188 (2015); S. Schaltin et al., *Chem. Commun.* 52, 414 (2016); J. Suttil et al., *J. Mater. Chem. A* 3, 7929 (2015); M. Miller et al., *J. Electrochem. Soc.*, 163, A578 (2016); L. J. Small et al., *J. Electrochem. Soc.* 163, A5106 (2016); L. Cosimbescu et al., *Sci. Rep.* 5, 14117 (2015); H.-S. Kim et al., *J. Power Sources* 283, 300 (2015); C. Jia et al., Sci. Adv. 1, e1500886 (2015); and H. Chen and Y.-C. Lu, *Adv. Energ. Mater.*, 1502183 (2016).

These chemistries often possess large cell voltages and stable redox activity, though are limited by the solubility of the redox-active species, with only a few exceeding 1 M. This limited solubility severely hinders the widespread deployment of RFBs. At a RFB energy density of 50 Wh/L, 230 times more volume is required to house a fully charged RFB electrolyte than the same energy content of natural gas. The fundamental difference between RFB electrolytes and natural gas lies at the molecular level; every molecule of natural gas participates in the energy-generating reaction, compared to <5% for many RFB electrolytes. Therefore, a need remains for a method to increase the energy density in RFB electrolytes.

SUMMARY OF THE INVENTION

The present invention is directed to a method for increasing the concentration of redox-active species in electrolytes for nonaqueous redox flow batteries. In general, the improved electrolyte can comprise a redox-active ionic liquid having a metal coordination cation coordinated to a number of redox-active ligands and an anion having an oxidation state, wherein the metal coordination cation comprises a transition metal ion and at least one the redox-active ligands comprises an aminoalcohol or a dialcoholamine. For example, the transition metal ion can comprise iron, copper, or manganese. The aminoalcohol can comprise ethanolamine, butanolamine, hexanolamine, or other simple aminoalcohol. For example, at least one of the redox-active ligands can comprise a metallocene, such as ferrocene. For example, at least one of the redox-active ligands can comprise a transition metal coordinated to a bipyridine group, such as tris(2,2'-bipyridine)nickel(II) or tris(2,2'-bipyridine)iron(II). For example, at least one of the redox-active ligands can comprise a quinone, (2,2,6,6-tetramethyl-piperidin-1-yl)oxyl, aniline, or methylviologen. For example, the anion can comprise iodide, ferricyanide, polyoxometallate, or peroxosulfate.

As an example of the invention, starting with an ionic liquid consisting of a metal coordination cation (MetIL), ferrocene-containing ligands and iodide anions can be substituted into the original MetIL structure. While chemical structures can be drawn for molecules with 10 M redox-active electrons (RAE), practical limitations such as melting point and phase stability constrain the structures to 4.2 M RAE, a 2.3× improvement over the original MetIL. Referred to as "MetILs$^3$" herein, these ionic liquids possess redox activity in the cation core, ligands, and anions. Throughout all compositions, infrared spectroscopy shows the ethanolamine-based ligands primarily coordinate to the Fe$^{2+}$ core via hydroxyl groups. Calorimetry indicates a profound change in thermophysical properties, not only in melting temperature, but also in suppression of a cold crystallization only observed in the original MetIL. Square wave voltammetry reveals redox processes characteristic of each molecular location. Testing a laboratory-scale RFB demonstrated Coulombic efficiencies >96% and increased voltage efficiencies due to more facile redox kinetics, effectively increasing capacity 4×. Application of this strategy to other chemistries, optimizing melting point and conductivity, could yield >10 M RAE, making nonaqueous RFB a viable technology for grid scale storage.

BRIEF DESCRIPTION OF THE DRAWINGS

The detailed description will refer to the following drawings, wherein like elements are referred to by like numbers.

FIGS. 8A-C are graphs showing performance of RFBs with catholyte containing 100 mM MetILs$^3$ 1a (circles) compared to 2a (triangles). FIG. 8A is a graph of coulombic efficiency.

DETAILED DESCRIPTION OF THE INVENTION

A redox flow battery (RFB) is a rechargeable battery in which a liquid electrolyte containing one or more dissolved redox-active groups flows through an electrochemical cell that reversibly converts chemical energy directly to electricity. Redox refers to the chemical reduction and oxidation reactions employed in the RFB to store energy in the ionic liquid electrolyte. The amount of energy stored in the RFB is determined by the total amount of redox-active groups available in the volume of electrolyte solution. Therefore, electrolytes for RFBs can be thought of as electrochemical fuel, where as much of the electrolyte as possible is integrated into the energy-storing redox process. Instead of the typical formula of electrolyte=solvent+supporting salt+redox active molecule, the electrolyte should be holistically designed so as to maximize energy storage.

Figure 1:
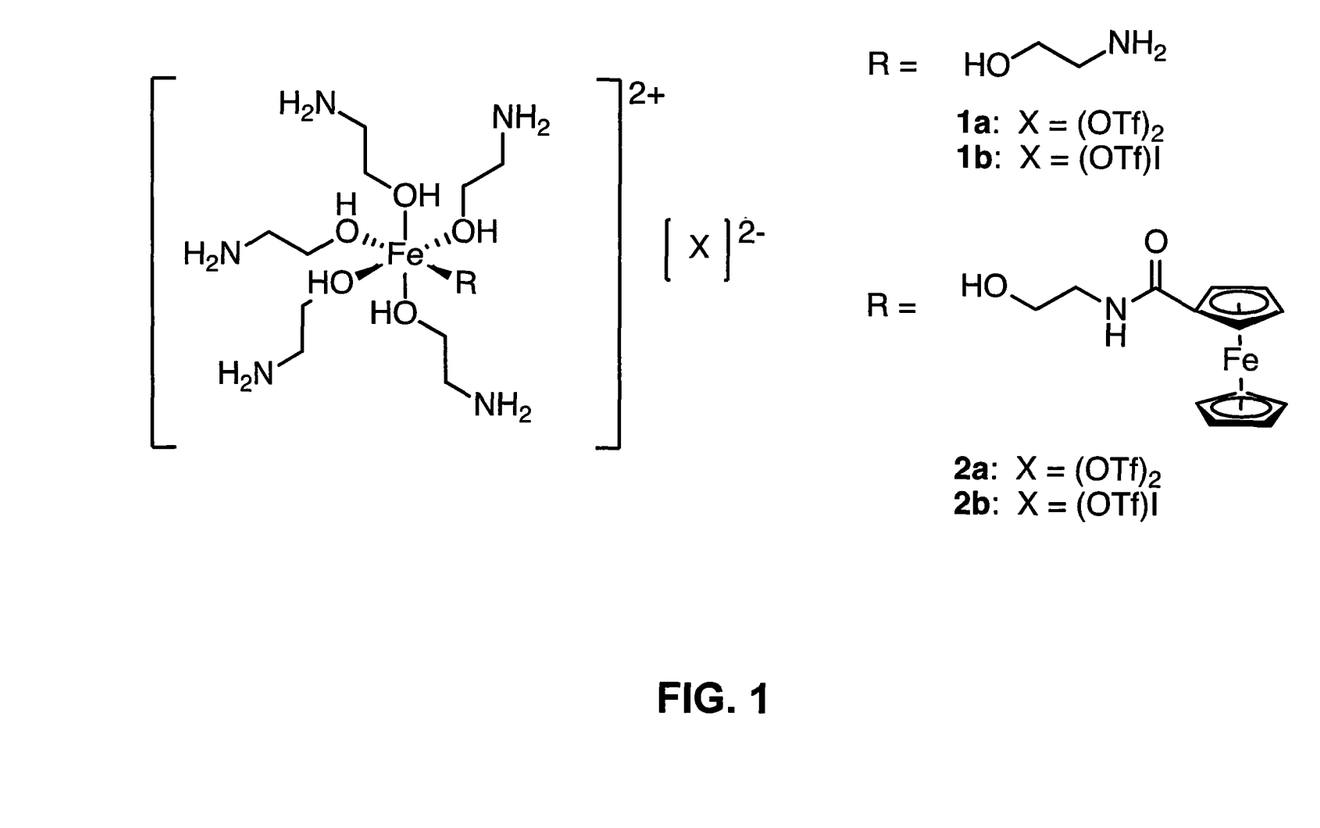
FIG. 1 is a schematic illustration of MetILs$^3$ of the family Fe(EA)$_{6-x}$(FcEA)$_x$(OTf)$_{2-y}$I$_y$. Redox activity of the original MetIL (1a) can be increased by substituting in either iodide anions (1b), ferrocene-containing ligands (2a), or both iodide anions and ferrocene-containing ligands (2b).

As shown in FIG. 1, increasing amounts of redox-active groups can be incorporated into the ligands and anions of the ionic liquid with a redox-active metal coordination cation (MetIL), yielding MetILs$^3$, a family of ionic liquids with redox activity in the ion core, ligands, and anions. See T. Anderson et al., *Dalton Trans.* 39, 8609 (2010). In this example, {[(2-hydroxyethyl)amino]carbonyl}ferrocene (FcEA) can be substituted for ethanolamine (EA) ligands of the metal coordination cation, and iodide can be substituted for triflate anions. Estimates suggest a density of 10 M redox-active electrons for MetILs$^3$ if all ligands were replaced by FcEA and all anions were replaced by iodide. While practical limitations such as melting point and viscosity limit the range of useful compositions, this general strategy can be applied to a wide range of redox-active ligands and ions. Therefore, a variety of anions, cations, and ligands can be combined to readily increase the energy density of single component chemistries which abound in the literature.

In general, the present invention is directed to a RFB electrolyte comprising a redox-active ionic liquid that comprises a metal coordination cation coordinated to a number of redox-active ligands and an anion. The metal coordination cation can comprise any transition metal ion, such as iron, copper, or manganese. The redox-active ligands can comprise an aminoalcohol and/or a dialcoholamine. The alkyl group of the alcohol can vary. For example, the aminoalcohol can comprise ethanolamine, butanolamine, hexanolamine, etc. A variety of redox-active species can be attached to or contained in the ligands. Many metallocenes, such as ferrocene, can be used. Also, transition metals coordinated to bypyridine groups can be used, such as tris(2,2'-bipyridine)nickel(II) or tris(2,2'-bipyridine)iron(II). Other families of redox-active species, such as quinones, (2,2,6,6-tetramethyl-piperidin-1-yl)oxyl (TEMPO), aniline, or methylviologen, can also be attached to the ligand. For example, the anion can comprise iodide, ferricyanide, polyoxometallate, or peroxosulfate.

As an example of the invention, MetILs$^3$ of the family Fe(EA)$_{6-x}$(FcEA)$_x$(OTf)$_{2-y}$I$_y$ were synthesized with increasing amounts of FcEA and iodide, in order to obtain a high energy density electrolyte. Specifically, MetILs$^3$ were synthesized in an argon-filled glovebox by thoroughly mixing stoichiometric amounts of iron (II) trifluoromethansulfonate (Fe(OTf)$_2$), iron (II) iodide, FcEA, and EA. FcEA was synthesized according to the literature. See J. Banfic et al., *Eur. J. Inorg. Chem.* 2014, 484 (2014). As FcEA concentrations were increased, the melting temperature also increased. For compositions with at least two FcEA ligands (x≥2), melting temperatures exceeded 100° C., limiting their applicability for RFB systems. For complete substitution of triflate by iodide, phase separation was observed over the course of one month, though for a single iodide substitution (MetIL$^3$ 1b) no phase separation was seen over the following 6 months. Therefore, these extreme compositions were avoided and the four ionic liquids shown in FIG. 1 were further characterized.

The physical properties of the resulting ionic liquids are summarized in Table 1. As expected, the concentration of redox active electrons (RAE) quickly increases as the FcEA ligands and iodide anions are added. Generally, substitution of FcEA increased the ionic liquid density, while substitution of iodide had no statistical effect. MetILs$^3$ 2 b displayed the highest energy density with 4.16 mol/L RAE, a 2.3× improvement over the starting MetIL 1a, and a promising pathway forward to designing high energy density electrolytes for RFB.

TABLE 1

Physical properties of the MetILs$^3$. "RAE" signifies redox-active electrons. Density, concentration, and electrical conductivity measurements were recorded at 25° C.

| Composition | Density/ g cm$^{-3}$ | RAE/ mol L$^{-1}$ | Conductivity/ mS cm$^{-1}$ | T$_g$/ ° C. | T$_{melt}$/ ° C. | H$_{melt}$/ J mol$^{-1}$ |
|---|---|---|---|---|---|---|
| 1a | 1.29 | 1.79 | 0.315 | −68.7 | 16.4 | 13.7 |
| 2a | 1.37 | 2.94 | — | −57.4 | 70.5 | 14.2 |
| 1b | 1.28 | 3.07 | 0.210 | −68.7 | 0.9 | 0.554 |
| 2b | 1.42 | 4.16 | — | −56.6 | 85.4 | 15.2 |

IR Spectroscopy

Figure 2:
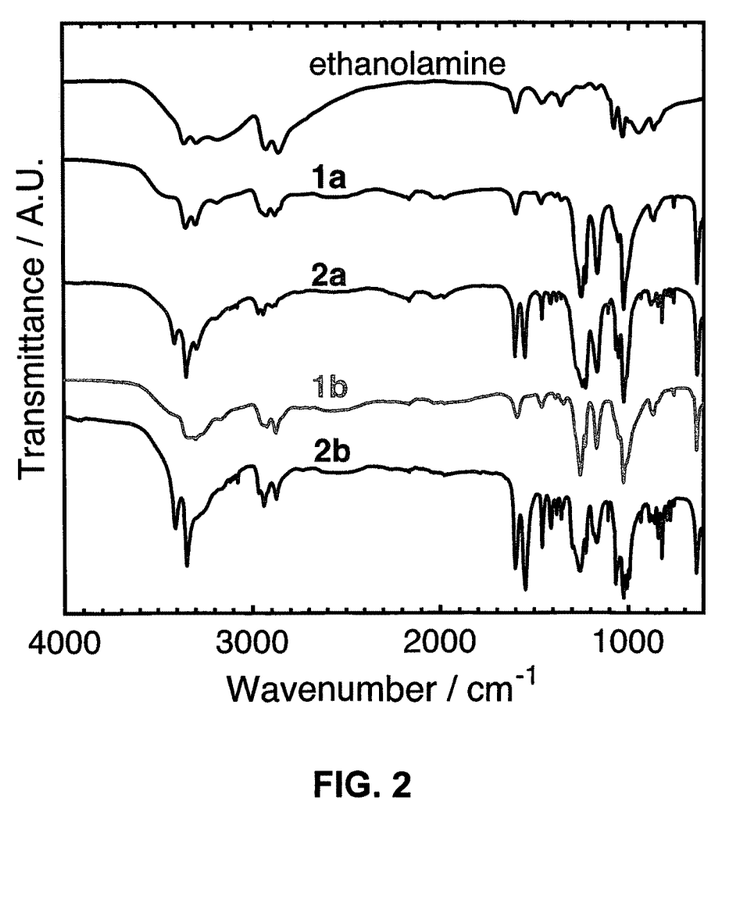
FIG. 2 is a graph showing the infrared (IR) spectrum of ethanolamine compared to those of MetILs$^3$ 1a, 2a, 1b, and 2b.

Successful coordination of the ligands to the metal ion center is seen by shifts in the O—H stretching peaks of the MetILs$^3$ compared to neat ethanolamine. Full IR spectra from each ionic liquid are compared to EA in FIG. 2, with specific shifts from the O—H (2860 cm$^{-1}$) and N—H (3354 cm$^{-1}$) peaks tabulated in Table 2. The larger shift in the position of the O—H stretch compared to that of the N—H stretch lends itself to the conclusion that the hydroxyl end of the EA is coordinated to the Fe$^{2+}$ center. This result is consistent with previous reports coupling a ferrocene group onto the amine end of the EA, allowing the FcEA to mimic the way the EA coordinates to the $Fe^{2+}$ center. See H. Pratt et al., *Dalton T.* 40, 11396 (2011).

TABLE 2

Shifts in IR peak locations for O—H and N—H stretches of MetILs³ 1a, 2a, 1b, and 2b as compared to neat ethanolamine.

| Composition | O—H/cm$^{-1}$ | N—H/cm$^{-1}$ |
|---|---|---|
| 1a | +20 | −7 |
| 2a | +16 | −7 |
| 1b | +18 | −7 |
| 2b | +15 | −8 |

Thermophysical Properties

The thermophysical properties of the MetILs³ were interrogated with differential scanning calorimetry. The resulting thermograms are plotted in FIG. 3, and relevant data compiled in Table 1. All MetILs³ displayed a glass transition starting between −70 and −50° C. The substitution of EA by FcEA increased the midpoint of the glass transition from −68.7 to −57.4° C., while the substitution of triflate by iodide did not significantly influence this transition temperature. That the anions did not influence the glass transition temperature suggests that this phenomenon is predominantly controlled by the ligands of the MetILs³.

Figure 3:
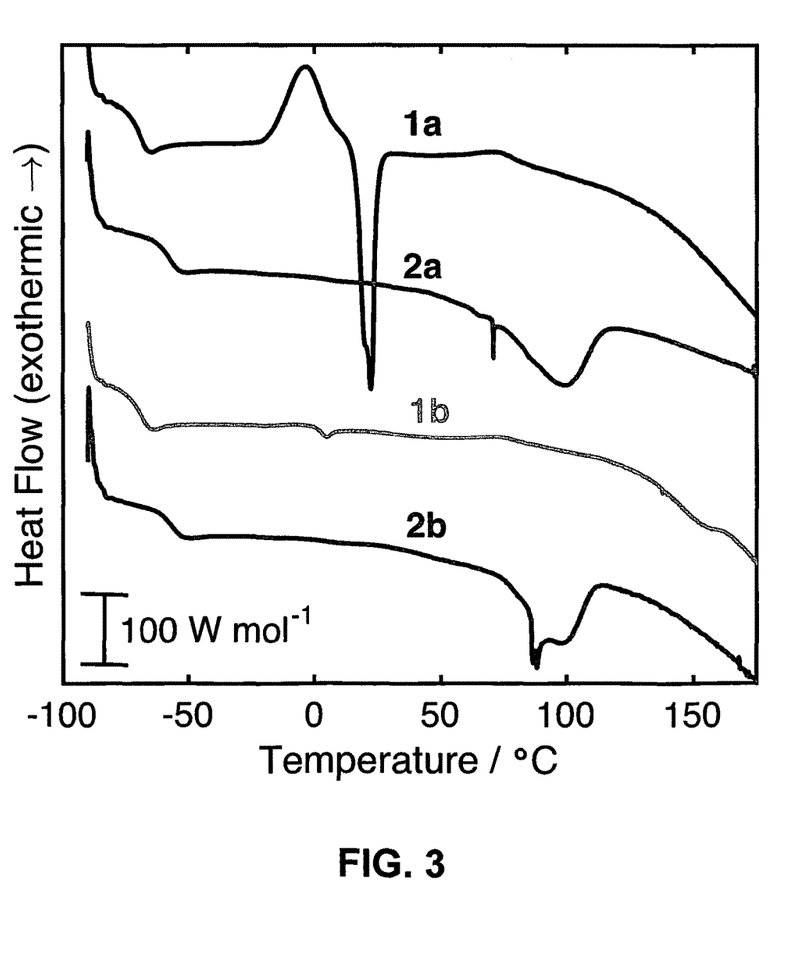
FIG. 3 is a graph showing differential scanning calorimetry (DSC) thermograms for MetILs$^3$ 1a, 2a, 1b, and 2b.

Upon further heating the MetILs³ a cold crystallization was seen at −17.8° C. for 1a. That is, the MetILs³ was supercooled and crystallized upon heating. Similar behavior has been observed for several imidazolium-based ionic liquids. See C. P. Fredlake et al., *J. Chem. Eng. Data* 49, 954 (2004). Addition of either FcEA or iodide was sufficient to suppress this cold crystallization, allowing the MetILs³ to remain a supercooled glass until the melting point was achieved.

The substitution of EA by FcEA increased both the shape and width of the melting temperature. While MetILs³ 1a displayed a sharp melting temperature with an onset at 16.4° C., addition of FcEA increased this onset temperature to 70.5° C., and only slightly increased the enthalpy of melting from 13.7 to 14.2 J mol$^{-1}$. These increases are likely due to increased molecular entanglement and the higher molar masses of the FcEA ligands compared to those of EA. Substitution of triflate anions by iodide significantly lowered the onset of melting from 16.4 in 1a to 0.9° C. in 1b. Additionally, the heat of melting decreased from 13.7 to 0.554 J mol$^{-1}$. This decrease in both melting temperature and enthalpy of melting suggests that the iodide anions significantly weaken the hydrogen bonding network of the MetILs³, enabling extreme supercooling and requiring less thermal energy to achieve the liquid state. Addition of both iodide and FcEA, however, resulted in the highest melting temperature. While the peak in melting temperature remained similar for 2a and 2b the width of the melting region was much narrower for the iodide-containing MetIL³ 2 b, resulting in a higher onset temperature for melting.

Electrochemical Evaluation

The electrochemical behavior of these redox-active ionic liquids was characterized using square wave voltammetry (SWV), a technique well-suited for differentiating overlapping redox processes while simultaneously rejecting background (non-Faradaic) currents. See J. Osteryoung and R. Osteryoung, *Anal. Chem.* 57, 101A (1985). In these voltammograms, three distinct electrochemical processes were observed, consistent with electrochemical activity in the MetIL³: (1) ion core, (2) ligand, and (3) anion. At the ion core, $Fe^{2+}$ is oxidized to $Fe^{3+}$, releasing a single electron. Likewise, the ferrocene-containing ligand is oxidized to ferrocenium, providing a single electron. The iodide anion can also be oxidized, forming triiodide and donating two electrons.

Figure 4:
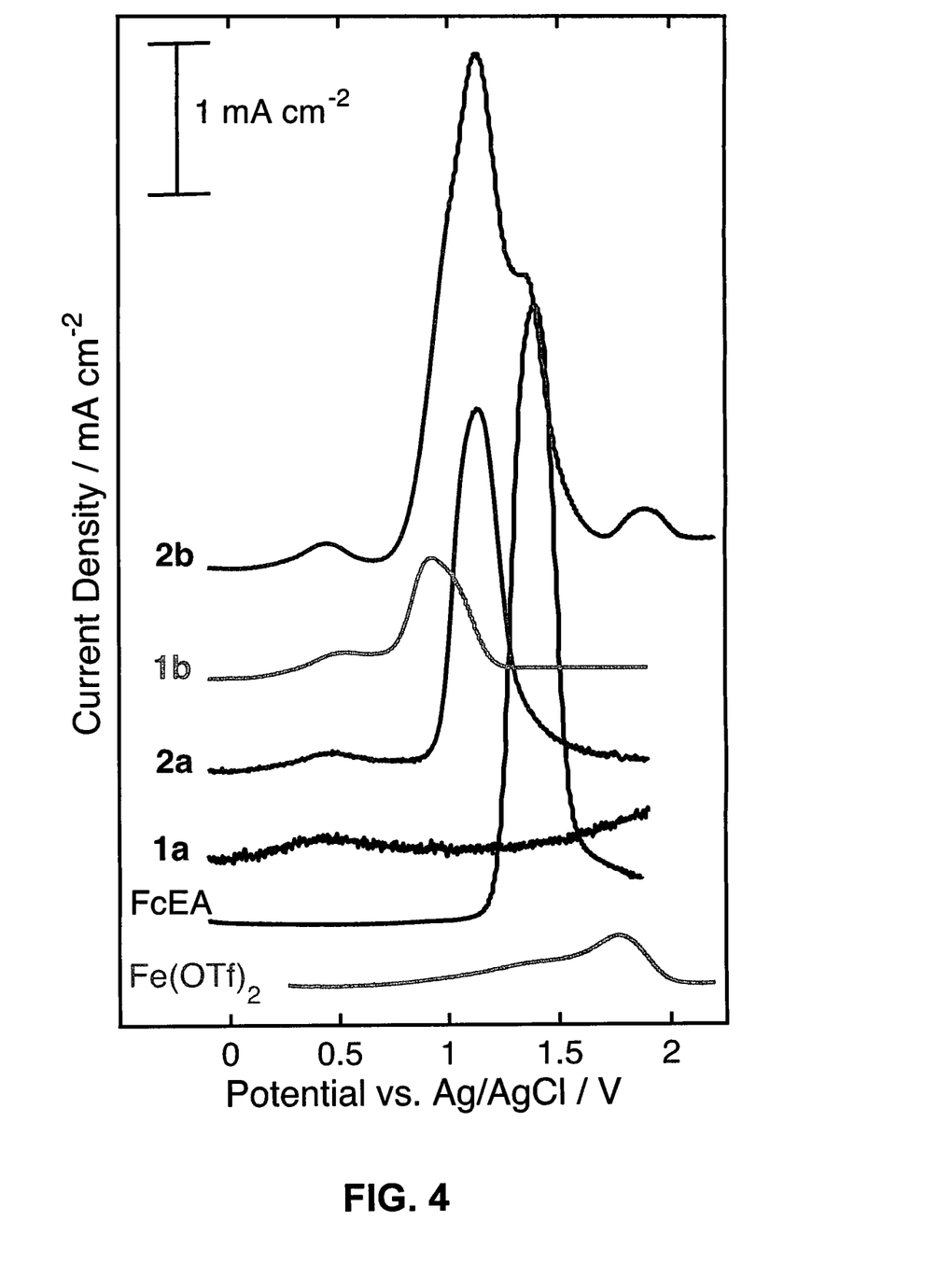
FIG. 4 is a graph showing square wave voltammograms (SWV) of a carbon fiber microelectrode in 0.5 M lithium bis(trifluoromethane)sulfonamide (LiNTf$_2$) in propylene carbonate (PC) with 10 mM iron (II) trifluoromethansulfonate (Fe(OTf)$_2$), {[(2-hydroxyethyl)amino]carbonyl}ferrocene (FcEA), or MetILs$^3$ 1a, 2a, 1b, and 2b.
Figure 5A:
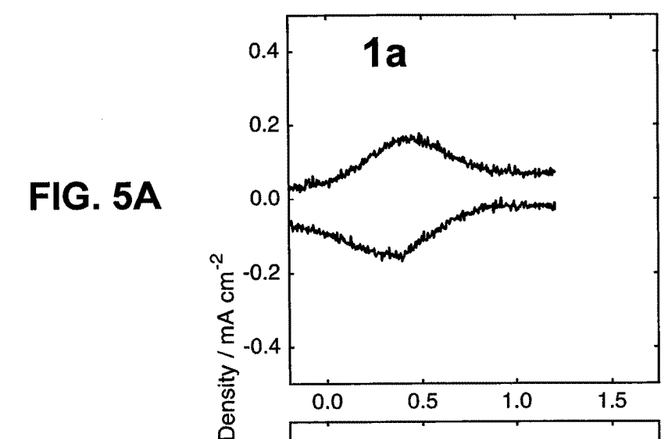
FIGS. 5A-D are graph showing square wave cyclic voltammograms of a carbon fiber microelectrode in 0.5 M LiNTf$_2$ in PC with 10 mM MetILs$^3$ (FIG. 5A) 1a, (FIG. 5B) 2a, (FIG. 5C) 1b, and (FIG. 5D) 2b.
Figure 5B:
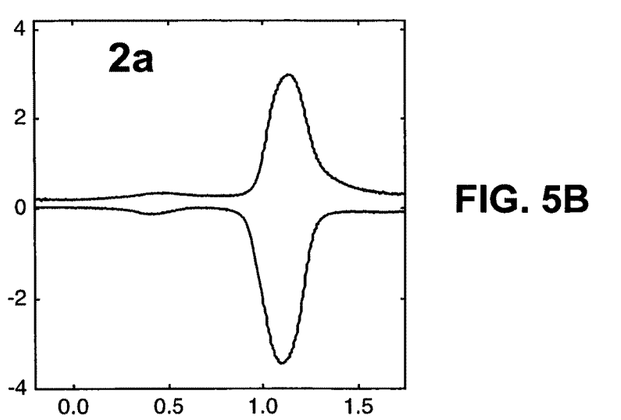
Figure 5C:
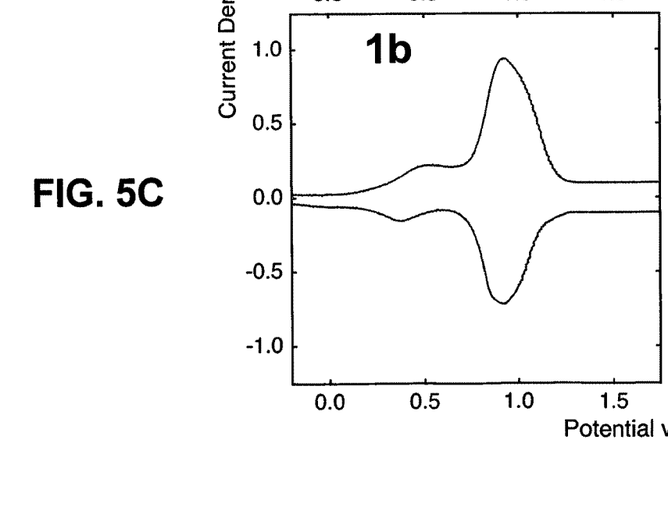
Figure 5D:
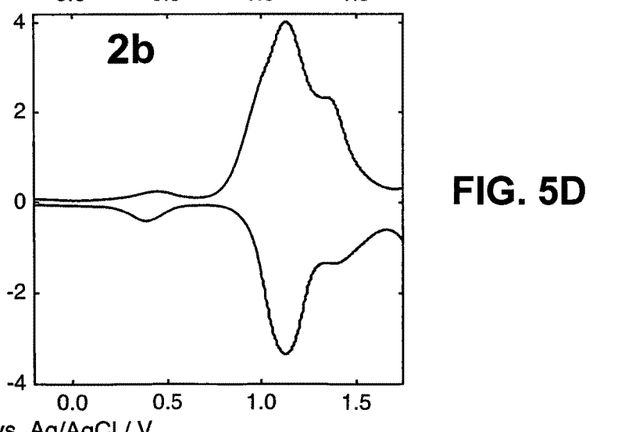

In FIG. 4, anodic SWV for each of the MetILs³ diluted to 10 mM in PC are compared to $Fe(OTf)_2$ and free FcEA. It is readily seen that when the $Fe(OTf)_2$ is coordinated with EA to form 1a, the redox potential dramatically shifts from 1768 to 418 mV vs. Ag/AgCl. This observation is consistent with previous reports, where diethanolamine ligands were shown to control the redox potential of the MetIL core more strongly than the identity (e.g. Fe, Cu, Mn) of the ion itself. See H. Pratt et al., *Dalton Trans.* 40, 11396 (2011). Throughout all of the MetILs³ tested in FIG. 4 a peak is observed at $E^{1/2}=420\pm17$ mV vs. Ag/AgCl. For 2b a distinct peak is observed near 1.9 V, suggesting that not all of the $Fe(OTf)_2$ has coordinated to the EA to form the MetIL³. Repeated stirring and heating of the MetILs³ during synthesis were unable to remove this peak for 2b.

As shown in FIG. 4, SWV of the FcEA ligand displays a sharp peak at 1392 mV vs. Ag/AgCl. Upon coordination of FcEA to the $Fe^{2+}$ center of 2a, the FcEA peak shifts to $E^{1/2}=1118$ mV, and decreases in intensity from 4.55 to 2.67 mA cm$^{-2}$. The decrease in peak current is attributed to a decrease in the diffusion constant of the bulky, relatively heavy MetILs³ complex compared to free FcEA. For 2b, a shoulder is seen at potentials characteristic of uncoordinated FcEA, again suggesting not all FcEA has coordinated to form 2b.

Substitution of triflate anions for iodide results in a peak on the SWV at $E^{1/2}=924$ mV vs. Ag/AgCl for 2a, and a shoulder at a similar location of the MetIL 2b. Across all MetILs³ voltammograms presented in FIG. 4, the relative peak heights suggest that the relative redox kinetics from (slowest) $Fe^{2+}$ core<iodide<FcEA ligands (fastest).

The quasi-reversibility of the individual redox processes were examined under sequential anodic and cathodic SWV scans, presented in FIG. 5. As expected, a single current peak is observed for MetIL 1a, with peak separation of 52 mV. Peak separations for core $Fe^{2+}$ oxidation in all other MetILs³ were within ±4 mV. For 2a, redox processes for both $Fe^{2+}$ ion core and FcEA are observed at $E^{1/2}=444$ and 1118 mV vs. Ag/AgCl, respectively. Here the FcEA peak separation is 28 mV. For 1b, redox processes for both $Fe^{2+}$ ion core and iodide anions are recorded at $E^{1/2}=410$ and 924 mV vs. Ag/AgCl, respectively. For 2b, the core $Fe^{2+}$ oxidation is seen at $E^{1/2}=406$ mV vs. Ag/AgCl, while a complex peak centered around 1.2 V likely contains redox processes for iodide oxidation, and oxidation of FcEA both free and coordinated to the metal center. Resynthesizing 2b with different mixing orders of reagents or heating or stirring for longer times was not found to eliminate the high potential shoulder associated with free FcEA. While lack of coordination for some FcEA is not ideal, these species remain still redox active and participate at a higher redox potential, effectively increasing the energy density if applied to a battery.

Flow Battery Testing

Figure 6:
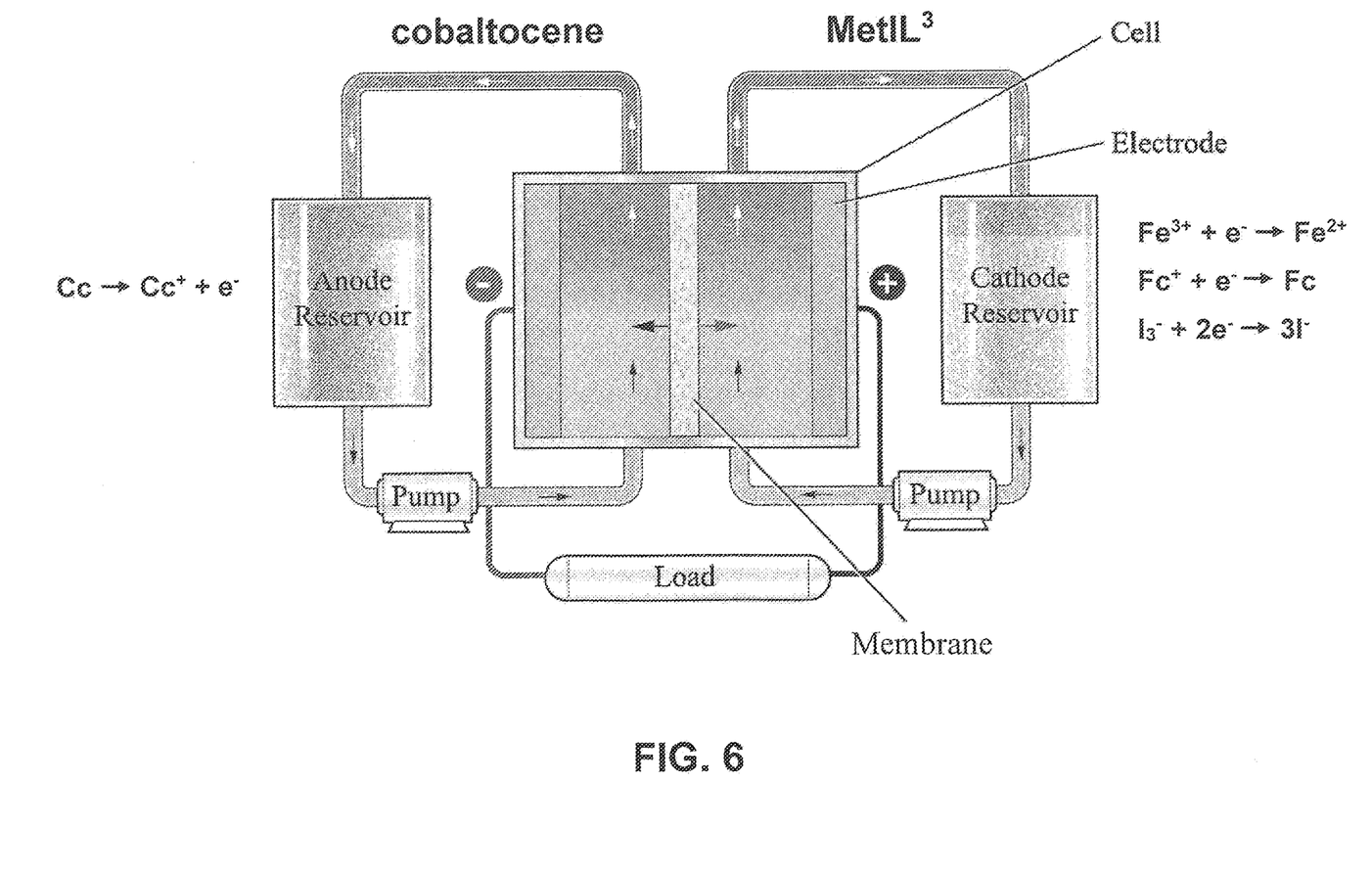
FIG. 6 is a schematic illustration of a laboratory-scale redox flow battery.

MetILs³ 1a and 2a were employed as catholytes in the laboratory-scale RFB shown in FIG. 6. To increase the MetILs³ limited ionic conductivity as reported in the Table 1, the MetILs³ were diluted to 0.1 M in propylene carbonate (PC) with 0.5 M lithium bis(trifluoromethane)sulfonamide (LiNTf$_2$). For proof of concept, 0.2 M cobaltocenium hexafluorophosphate (CcPF$_6$) was chosen as the anolyte (also in 0.5 M LiNTf$_2$ in PC), and both electrolytes maintained at 25° C. and cycled at 5 mA cm$^{-2}$ between 0.25 and 2.5 V. During discharge, cobaltocenium is oxidized on the negative or anode side of the battery and MetIL³ is reduced on the positive or cathode side of the battery. The direction of the current and the chemical reactions are reversed during charging.

Figure 7:
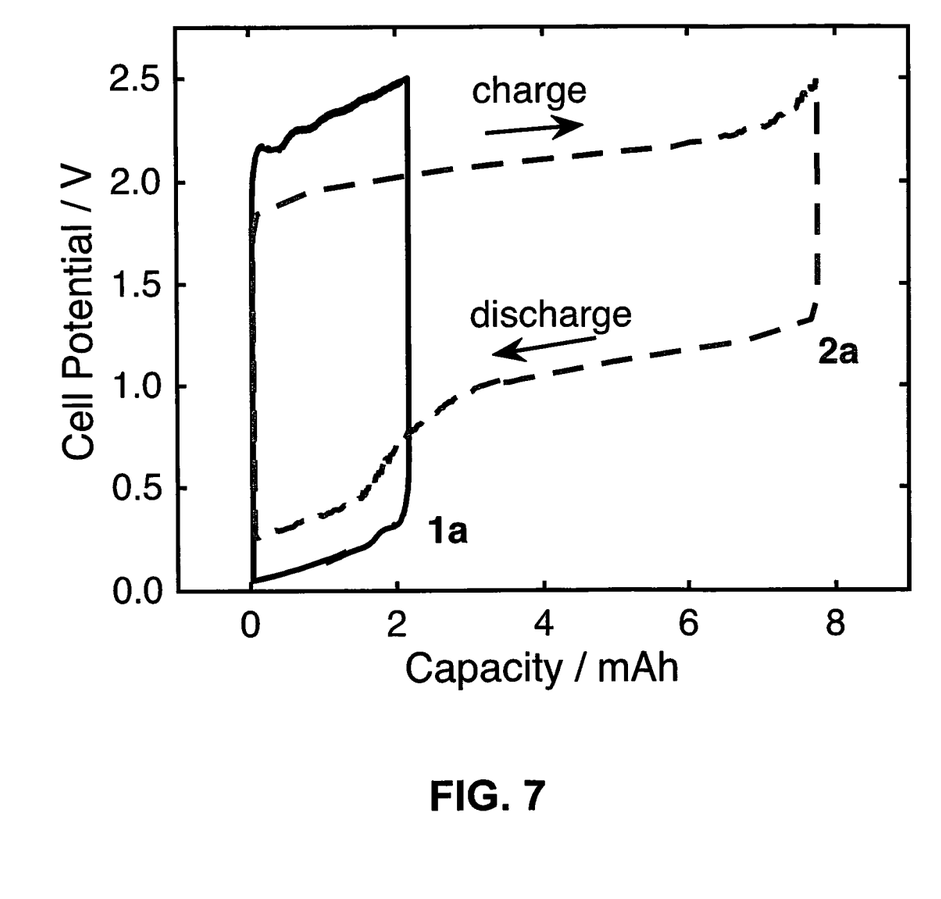
FIG. 7 is a graph showing charge-discharge curves of the third cycle at 5 mA cm$^{-2}$ for flow batteries with 200 mM cobaltocenium hexafluorophosphate (CcPF$_6$) anolyte and 100 mM MetILs$^3$ 1a (solid line) compared to 2a (dashed line). Supporting electrolyte for anolyte and catholyte was 0.5 M LiNTf$_2$ in PC at 25° C.

After the first three cycles, the lower voltage limit on the RFB with 1a was decreased to 0 V in an attempt to increase cell capacity. Charge-discharge curves from the 3$^{rd}$ cycle from each RFB is plotted in FIG. 7. Upon charging both RFBs display a single voltage plateau, though 2a required significantly less voltage and charged to nearly 4× capacity given the same 2.5 V limit. While only a 2× increase in cell capacity is expected from the molecular formula, the more facile redox kinetics afforded by the FcEA groups in 2a required less overpotential to achieve the same 5 mA cm$^{-2}$ charging current, resulting in a nearly 4× increase in capacity. Upon discharge, two distinct plateaus are observed for 2a near 1.0 V and 0.25 V, attributed to discharging the FcEA and Fe$^{3+}$ core, respectively. As expected, 1a displayed only a single discharge plateau due to reduction of the Fe$^{3+}$ core.

Figure 8A:
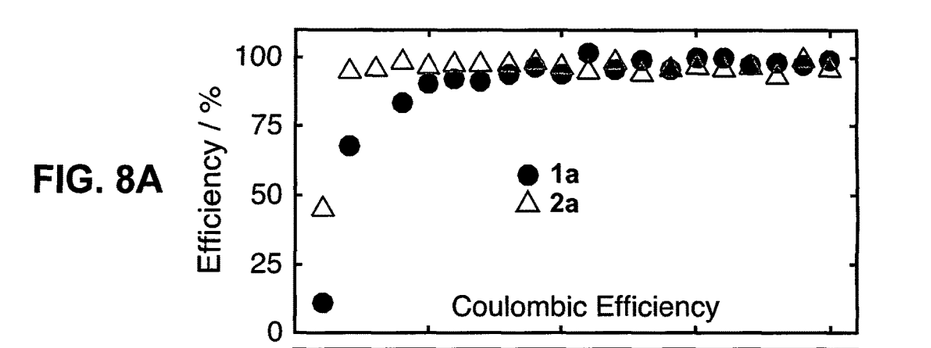
Figure 8B:
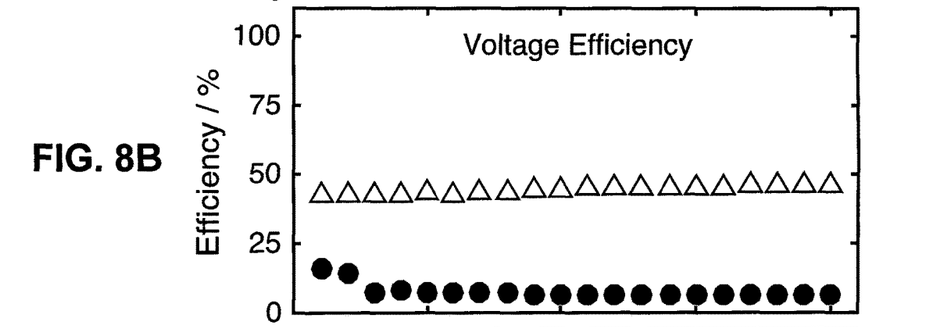
FIG. 8B is a graph of voltage efficiency.
Figure 8C:
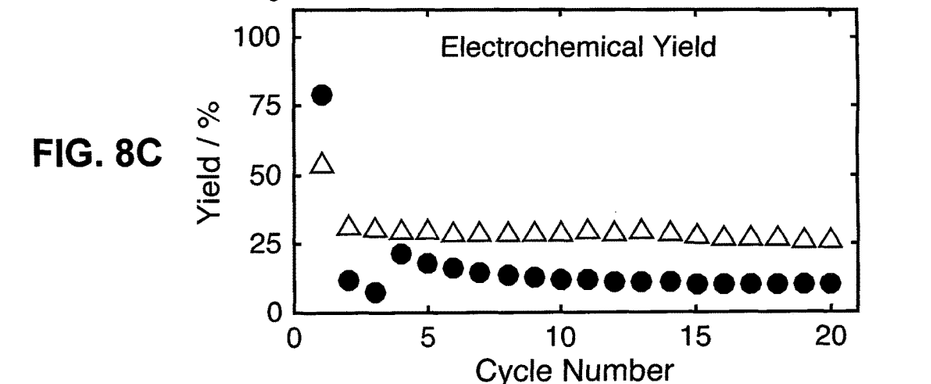
FIG. 8C is a graph of electrochemical yield.

The performance of RFBs with MetILs³ for 1a or 2a are compared in FIGS. 8A-C. Both MetILs³ show an initial increase in Coulombic efficiency in FIG. 8A from <50% to >95% efficiency, though this increase is faster for 2a than 1a. On the other hand, as shown in FIG. 8B, voltage efficiencies for these RFBs were quite different, with the 2a composition showing 46.1% efficiency after 20 cycles, compared to 6.4% efficiency for 1a. As shown in FIG. 8C, the electrochemical yield (% of theoretical capacity) performed similarly, with an initial rapid drop for the first two cycles followed by a slow decline to 25.6% yield for 2a, compared to 9.9% for 1a. Thus, it is concluded that the FcEA group on the 2a MetIL³ enabled faster redox kinetics, resulting in higher voltage efficiencies and electrochemical yields compared to the original 1a. Both compositions, however, eventually reached stable cycling conditions and >95% Coulombic efficiencies.

The electrochemical yield of the RFB is limited in a large part due to crossover of cobaltocene species from the anolyte. Cyclic voltammometry analysis of the MetILs³ catholyte after testing showed significant concentrations of cobaltocene. The inability of the anion conductive membrane (Fumasep® FAP-PK. Fumasep® is a registered trademark of FuMA-Tech) to prevent crossover of redox-active cations ultimately resulted in a reduction of electrochemical yield, which prevented testing of MetILs³ with redox-active iodide anions. If a highly-conductive room temperature membrane highly selective towards one non-redox active species (e.g. Li$^+$) can be identified, iodide-containing 2b might be successfully tested and yield even higher capacities.

In summary, the energy density of an electrolyte for a RFB can be increased by systematically adding redox-active ligands and anions to MetILs³ of the family Fe(EA)$_{6-x}$(FcEA)$_x$(OTf)$_{2-y}$I$_y$. While addition of these species did not change the general orientation of the ligands about the ion core, the thermophysical properties of the MetILs³ varied drastically as more redox activity was incorporated into the structure. Electrochemical characterization of these MetILs³ showed redox processes unique to the ion core, ligands, and anions, confirming successful synthesis of the MetILs³. Testing in a laboratory-scale RFB demonstrated that the more facile redox kinetics afforded by the FcEA group of 2a enabled nearly 4× increase in capacity compared to the RFB with 1a cycled at the same composition. Application of this strategy to other chemistries, optimizing electrolyte melting point and conductivity could yield >10 M redox-active electrons, though identification of a highly selective membrane will be necessary to maintain all available capacity.

The present invention has been described as a method for maximizing energy density in redox flow battery electrolytes. It will be understood that the above description is merely illustrative of the applications of the principles of the present invention, the scope of which is to be determined by the claims viewed in light of the specification. Other variants and modifications of the invention will be apparent to those of skill in the art.

We claim:

1. A nonaqueous redox flow battery electrolyte, comprising a redox-active ionic liquid comprising a metal coordination cation coordinated to a number of redox-active ligands and an anion having an oxidation state, wherein the metal coordination cation comprises a transition metal ion and at least one of the redox-active ligands comprises an aminoalcohol, or a dialcoholamine, wherein the ionic liquid comprises Fe(EA)$_{6-x}$(FcEA)$_x$(OTf)$_{2-y}$I$_y$, wherein iron is the transition metal ion having a coordination number of 6, wherein the aminoalcohol is ethanolamine, 6-x is the number of ethanolamine ligands, and x is the number of {[(2-hydroxyethyl)amino]carbonyl}ferrocene redox-active ligands substituted for ethanolamine ligands, and wherein the anion is iodide, 2 is the oxidation state, and y is the number of iodide anions substituted for triflate anions.

2. The electrolyte of claim 1, wherein x is 6 or less.
3. The electrolyte of claim 2, wherein x is 1 or 2.
4. The electrolyte of claim 1, wherein y is 2 or less.
5. The electrolyte of claim 4, wherein y is 0 or 1.
6. The electrolyte of claim 1, wherein the Fe(EA)$_{6-x}$(FcEA)$_x$(OTf)$_{2-y}$I$_y$ comprises greater than 1.79 M and less than 4.2 M redox-active electrons in the ionic liquid.

* * * * *